April 29, 1952     E. C. CRAWFORD     2,594,402
TOOLHOLDER
Filed Aug. 30, 1949
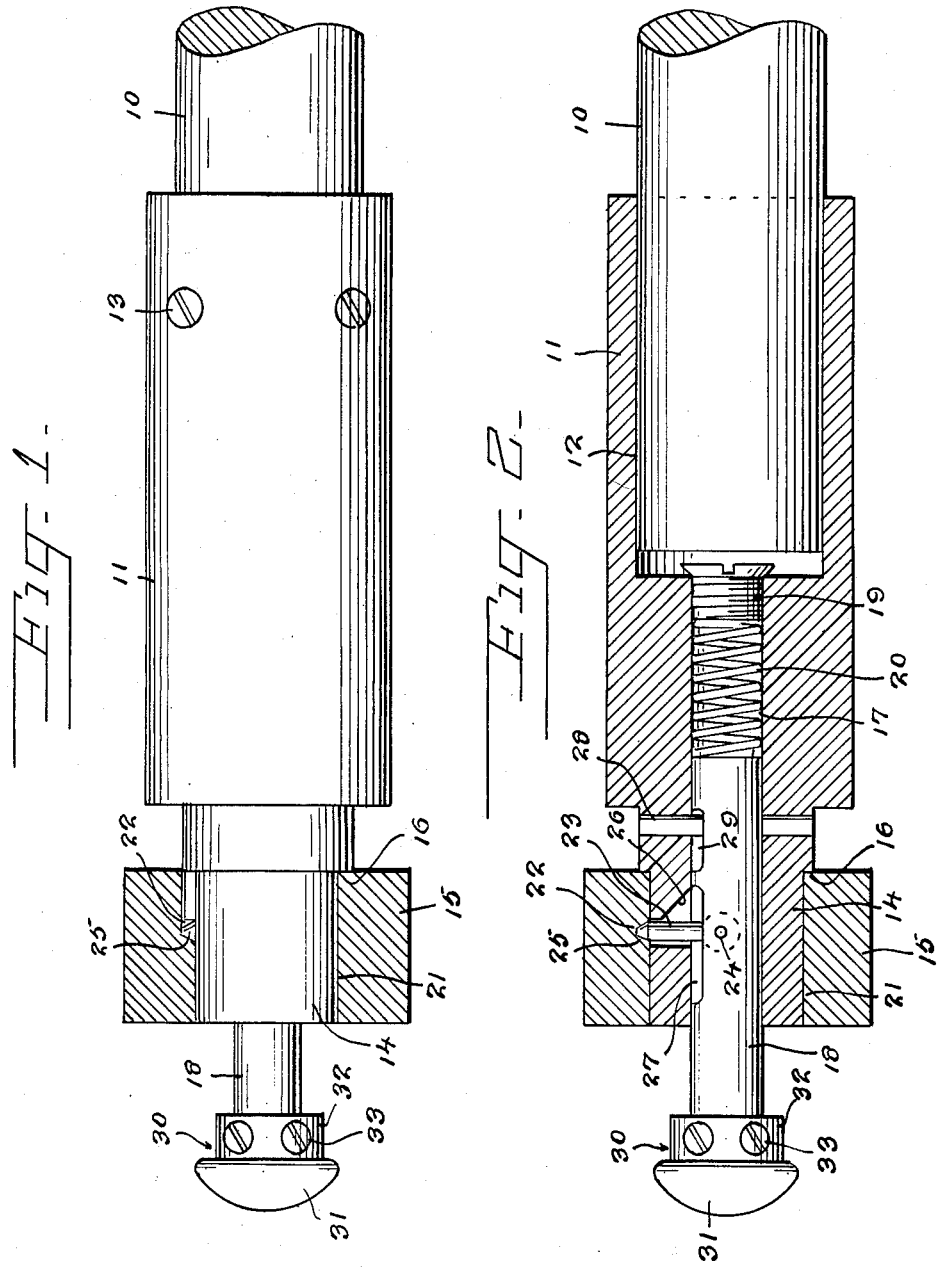
INVENTOR.
Elijah C. Crawford
BY *Victor J. Evans & Co.*
ATTORNEYS Patented Apr. 29, 1952

2,594,402

UNITED STATES PATENT OFFICE 2,594,402

TOOLHOLDER

Elijah C. Crawford, Chicago, Ill.

Application August 30, 1949, Serial No. 113,212

4 Claims. (Cl. 287—53)

This invention relates to a tool holder, and more particularly to a holder for clamping a rotary tool, such as an edge setter, onto a rotating shaft, such as a shaft on a shoe repairing machine.

The object of the invention is to provide a holder whereby the tool can be clamped onto or removed from the end of a rotary shaft without the necessity of stopping the rotation of the shaft.

Another object of the invention is to provide a tool holder for clamping a tool onto a rotary shaft of a machine whereby the tool can be attached or detached from a rotary shaft quickly and safely and without stopping rotation of the shaft so that the work of others using the machine will not be interfered with.

A further object of the invention is to provide a tool holder which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view, illustrating the tool holder connecting an edge setting tool to a shaft, according to the present invention, the tool being shown in section;

Figure 2 is a longitudinal sectional view through the assembly of Figure 1.

Referring in detail to the drawings, there is shown an end of a shaft 10 that may be part of any machine, such as a machine used by those engaged in the repair of shoes. The present invention is directed to a holder for clamping a rotary tool, such as an edge setter, onto the end of the shaft 10, and by using the holder of the present invention, it is not necessary to stop the rotation of the shaft 10 in order to detach or attach the tool onto the shaft 10 as later described in this application.

The holder of the present invention comprises a body member 11 which is provided with an interior socket 12 for receiving therein the end of the shaft 10. Suitable securing elements, such as screws 13, Figure 1, project through the body member 11 and into engagement with the shaft 10 for maintaining the body member 11 on the shaft 10.

The body member 11 is shaped to define a support member 14 which projects from an end thereof, and mounted on the support member 14 is the edge setting tool 15, the tool 15 abutting a shoulder 16 on the support member 14.

Extending through the support member 14, and through the body member 11, is a central bore 17 which has a plunger 18 slidably arranged therein. A screw or closure member 19 is threaded into the inner end of the bore 17, and a coil spring 20 is positioned in the bore 17 and interposed between the closure member 19 and the plunger 18, Figure 2. The coil spring 20 serves to normally urge the plunger 18 out of the bore 17.

The edge setting tool 15 is provided with a central socket 21 through which projects the support member 14. Further the tool 15 is provided with an inner groove or recess 22 which extends longitudinally therethrough for a portion of its length.

A lock pin 23 has one of its ends pivotally connected to the plunger 18 by means of a pin 24, and the other end of the pin 23 is pointed as at 25, the pointed end 25 adapted to seat in the groove 22 in the tool 15. The pin 23 projects through a cutout 26 in the support member 14, and the plunger 18 is cut away, as at 27, to provide ample clearance for the movement of the pin 23. A pin 28 projects through the support member 14 and into engagement with the plunger 18, there being a cut away or cut out 29 in the plunger 18 to allow the pin 28 to ride therein as the plunger 18 is moved in the bore 17.

Secured to the outer projecting end of the plunger 18 is a knob 30. The knob 30 includes a collar 32 that embraces the plunger 18, and suitable set screws 33 project through the collar 32 for securing the knob to the plunger 18. The knob 30 is provided with a round head 31 for a purpose to be later described.

From the foregoing, it is apparent that a holder has been provided whereby a tool, such as the annular edge setter 15, can be readily attached to or detached from the rotating shaft 10 without the necessity of stopping the rotation of the shaft 10. Thus, to remove the tool 15, from the shaft 10, the user merely manually depresses the plunger 18 against the coil spring 20 until the end 25 of the pin 23 is free from the groove 22 in the tool 15. Then, the tool 15 can be readily removed from the support member 14.

Similarly, the tool 15 can be readily attached to the shaft 10 by depressing the plunger 18, then positioning the tool 15 on the support member 14, and then releasing the pressure on the plunger 18 whereupon the spring 20 will move the plunger 18 to the position shown in Figure 2, so that the end 25 of the pin 23 will move into the groove 22 whereby the tool 15 will be locked onto the support member 14. It will be seen that rotation of the shaft 10 causes rotation of the body member 11, and this in turn causes the plunger 18 and the edge setting tool 15 to rotate.

The device of the present invention is especially useful for shoe repairing machines, so that it is not necessary to stop the operation of the machine in order to change an edge setter. Further, the knob 30 has a rounded head 31 so that the user's hand will not be injured during the depression of the plunger 18. Further, the knob 30 can be used to open narrow welts instead of using hand tools, or else, the knob can be used for rubbing down stitches on welts after shoes have been sewed. Also, the rounded head 31 provides a means for smoothing sewed or cemented patches on the upper part of shoes and the like. Other tools, besides the edge setter 15 can be attached to the shaft 10; thus, emery wheels, wire brushes, stitching pickers, and the like can be used in place of the edge setting tool 15.

What I claim:

1. In a holder for clamping a tool to the end of a shaft, said tool having a groove arranged centrally therein, a body member provided with a socket for receiving therein the end of the shaft, means for securing said body member to said shaft, a support member projecting from an end of said body member and being of a smaller diameter than the latter, an annular shoulder on said support member of smaller diameter than said body member but of larger diameter than said support member, there being a bore extending through said support member and communicating with said socket, a plunger slidably arranged in said bore, a pin having one end pivotally connected to said plunger and its other end mounted for movement into and out of engagement with the groove in said tool, resilient means abutting said plunger for urging said pin into engagement with the groove in said tool, and a second pin in said shoulder engaging said plunger to limit the movement thereof.

2. In a holder for clamping a tool to the end of a shaft, said tool having a groove arranged centrally therein, a body member provided with a socket for receiving therein the end of the shaft, means for securing said body member to said shaft, a support member projecting from an end of said body member and being of a smaller diameter than the latter, an annular shoulder on said support member of smaller diameter than said body member but of larger diameter than said support member, there being a bore extending through said support member and communicating with said socket, a plunger slidably arranged in said bore, a pin having one end pivotally connected to said plunger and its other end mounted for movement into and out of engagement with the groove in said tool, resilient means embodying a coil spring positioned in said bore and abutting said plunger for urging said pin into engagement with the groove in said tool, and a second pin in said shoulder engaging said plunger to limit the movement thereof.

3. In a holder for clamping a tool to the end of a shaft, said tool having a groove arranged centrally therein, a body member provided with a socket for receiving therein the end of the shaft, means for securing said body member to said shaft, a support member projecting from an end of said body member and being of a smaller diameter than the latter, an annular shoulder on said support member of smaller diameter than said body member but of larger diameter than said support member, there being a bore extending through said support member and communicating with said socket, a plunger slidably arranged in said bore, a pin having one end pivotally connected to said plunger and its other end mounted for movement into and out of engagement with the groove in said tool, resilient means embodying a coil spring positioned in said bore and abutting said plunger for urging said pin into engagement with the groove in said tool, a knob secured to the exterior projecting end of said plunger, and a second pin in said shoulder engaging said plunger to limit the movement thereof.

4. In a holder for clamping a tool to an end of a shaft, said tool having a groove arranged centrally therein, a body member provided with a socket for receiving therein the end of the shaft, securing elements for fastening said body member to said shaft, a support member of reduced diameter projecting from an end of said body member, there being a bore extending through said support member and communicating with the socket in said body member, a plunger slidably arranged in said bore, a closure member threaded into an end of said bore, a coil spring positioned in said bore and interposed between said closure member and plunger, a knob secured to the outer projecting end of said plunger, there being a cut out in said support member, and a pin having one end pivotally connected to said plunger and projecting through said cutout into the groove in said tool.

ELIJAH C. CRAWFORD.

REFERENCES CITED

The following references are of record in the file of this patent:

UNITED STATES PATENTS

| Number | Name | Date |
|---|---|---|
| 1,760,843 | Hasty | May 27, 1930 |
| 2,009,371 | Junge | July 23, 1935 |
| 2,251,470 | Stacey | Aug. 5, 1941 |